No. 747,406. PATENTED DEC. 22, 1903.
G. W. FOSTER.
CONE ARBOR.
APPLICATION FILED APR. 21, 1903.
NO MODEL.
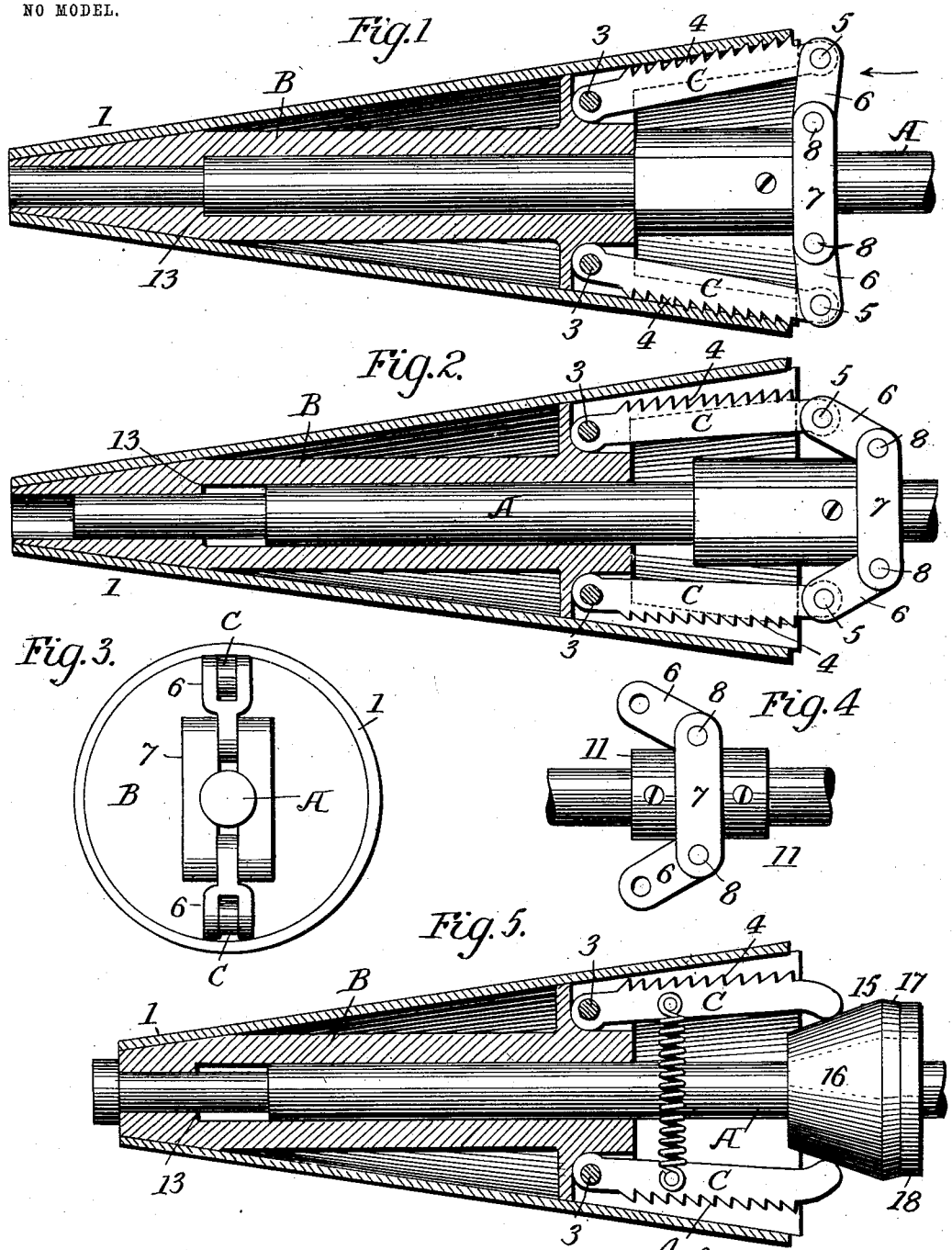

No. 747,406. Patented December 22, 1903.

UNITED STATES PATENT OFFICE.

GEORGE W. FOSTER, OF PAWTUCKET, RHODE ISLAND.

CONE-ARBOR.

SPECIFICATION forming part of Letters Patent No. 747,406, dated December 22, 1903.

Application filed April 21, 1903. Serial No. 153,627. (No model.)

*To all whom it may concern:*

Be it known that I, GEORGE W. FOSTER, a citizen of the United States, residing at Pawtucket, in the county of Providence and State of Rhode Island, have invented certain new and useful Improvements in Cone-Arbors, of which the following is a specification.

My invention relates to means for connecting cop-tubes to holders with which they must be rotated; and it consists in supporting the holders to slide on their shafts and in means whereby the application of a cop-tube to the holder to slide it inward will result in carrying outward toothed bars to a position for their teeth to engage and maintain the tube upon the holder, as fully set forth hereinafter and as illustrated in the accompanying drawings, in which—

Figure 1 is a longitudinal sectional view illustrating a shaft and holder and retaining means embodying my improvements; Fig. 2, the same, showing the parts in a different position; Fig. 3, an end view of Fig. 1 looking in the direction of the arrow; Fig. 4, a detached view showing an arrangement of the parts when the shaft is stationary and the holder is to rotate thereon. Fig. 5 is a detached view illustrating different means for swinging the toothed bars outward.

The spindle A may be a rotating spindle, carrying with it a holder B, or the spindle may be stationary and the holder B may rotate thereon. The holder B may be cylindrical or conical, so as to support a cop-tube or quill 1 of corresponding shape, a conical holder being shown adapted to slide inward upon the spindle A to an extent limited by a shoulder 13. I make use of this inward movement of the holder as a means of moving radially outward a series of bars C, each provided with a row of sharp teeth 4, the holder being slotted to permit the bars to move outward sufficiently to bring the teeth to positions beyond the holder to engage and retain the cop-tube. While the bars may be supported and operated in different ways, I have shown bars each pivoted to the holder at a point 3 at one end and within a slot in the holder and connected at the other end to a link 6, the inner end of which is pivoted to a block or collar 7 upon the shaft A and secured thereto in the construction shown in Figs. 1, 2, and 3, where the shaft rotates, or turning on the shaft between two collars 11 11, as shown in Fig. 4, when the holder rotates on the shaft. Preferably the parts are so proportioned that by the time the holder is carried to the limit of its inward movement the pivots 5 at the outer ends of the links 6 may be carried beyond the inner pivots 8 to such an extent that the centers of the outer pivots will have passed those of the inner pivots when the holder has reached its inward position, so that any pressure tending to swing the bars inward will have the effect of locking the parts more securely together and retaining the holder in its inward position. When the cop or cop-tube has to be removed, pressure applied to the ends of the bars C in the direction of the arrow, Fig. 1, will be sufficient to carry the centers of the pins 5 outward of the centers of the pins 8 and to slide the holder outward, when the bars will be carried radially inward, as shown in Fig. 2, and the cop-tube can be removed.

In the construction shown in Fig. 5 the ends of the bars C slide over the bevel-face 15 of a disk 16, secured to or turning upon the shaft A, and are thereby moved outward until they pass the edge of the face 15 onto a reversely-inclined face 17 and take their bearings on a shoulder 18, the effect being the same as before—that is, after the bearings of the bars have passed the highest point the pressure thereon tends to carry them farther in the same direction and to retard or prevent the return sliding movement.

Without limiting myself to the construction and arrangement of parts shown, I claim—

1. The combination of a cop-holder adapted to fit and frictionally engage the inner face of a cop-tube, a rotating shaft supporting the holder to permit the latter to slide freely thereon under the pressure of the cop-tube to a limited extent, and positively driving the holder, bars, each carrying teeth and supported to move radially outward to project the teeth beyond said holder, and means whereby the bars are swung outward as the holder is pushed inward on the shaft, substantially as set forth.

2. The combination of a cop-holder, a rotating shaft supporting the holder to permit the latter to slide thereon to a limited extent, bars, each carrying teeth and supported to move radially outward to project the teeth beyond said holder, means whereby the bars are swung outward as the holder is pushed longitudinally inward and are then carried slightly inward under the pressure of the cop-tube as the holder terminates its movement, and means for resisting the outward movement of the bars and holder, substantially as set forth.

3. The combination of the shaft, sliding holder, toothed bars, connected to the holder, and means whereby the outer ends of the bars are carried radially outward and then slightly inward as the holder is pushed longitudinally inward under the pressure of the cop-tube in applying the latter to the holder, substantially as set forth.

4. The combination of a shaft, rotating cop-tube holder sliding thereon and turning therewith, toothed bars pivoted to the holder, and means supported by the shaft for forcing the bars outward as the holder is carried inward and for locking the parts frictionally in place after adjustment, substantially as set forth.

5. The combination of the rotating shaft, holder turning with and sliding thereon and adapted to engage the interior of a cop-tube, toothed bars pivoted to the holder, a block or sleeve upon the shaft, and links connecting the ends of the bars and said block, substantially as set forth.

6. The combination of the rotating shaft, holder turning with and sliding thereon and adapted to engage a cop-tube, toothed bars pivoted to the holder, a block or sleeve upon the shaft, and links connecting the ends of the bars and said block, the outer pivots of the links being beyond the centers of the inner pivots when the holder is at the limit of its inward motion, substantially as set forth.

7. The combination of the rotating shaft, slotted holder turning with and sliding thereon, toothed bars pivoted to move in the slots of the holder, links pivoted to the bars and to the shaft, with means for permitting a movement of the holder under the pressure of the cop-tube until the outer centers of the links have passed the inner centers, substantially as set forth.

8. The combination of a rotating shaft, cop-tube holder turning with and sliding thereon, bars supported to move radially, and means supported by the shaft for forcing the bars outward as the holder is carried inward under the pressure of the cop-tube and for locking the parts frictionally in place after adjustment, substantially as set forth.

In testimony whereof I have signed my name to this specification in the presence of two subscribing witnesses.

GEO. W. FOSTER.

Witnesses:
ANNIE F. RACE,
JOHN E. CANNING.